United States Patent Office 3,572,371
Patented Mar. 23, 1971

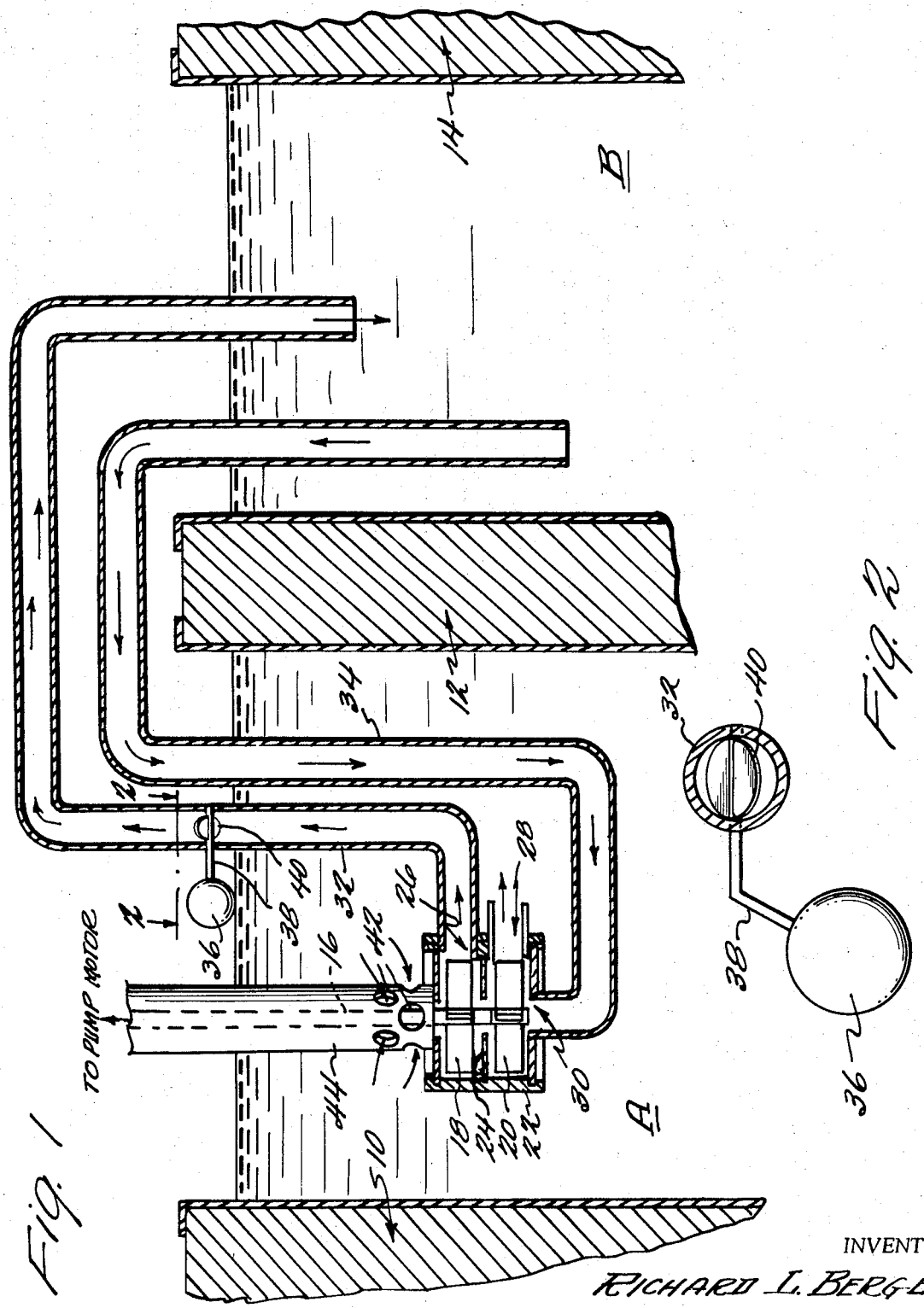

3,572,371
TEMPERATURE CONTROL SYSTEM FOR A LIQUID BATH
Richard L. Bergen, Marietta, Ohio, assignor to Forma Scientific, Inc., Marietta, Ohio
Filed Jan. 6, 1969, Ser. No. 789,231
Int. Cl. F16k 33/00; F28d 7/00
U.S. Cl. 137—398                                14 Claims

ABSTRACT OF THE DISCLOSURE

An arrangement for precisely controlling the temperature of a bath. A heat exchanger tank is positioned adjacent the bath. A double pump is immersed in temperature-controlled liquid within the tank. One pump is of the suction type, and the other is a pressure pump. An open-ended conduit extends from each of the pumps into the bath such that as the pumps are driven, liquid circulates between the tank and the bath. A level control device in the tank maintains its volume constant. In this manner the temperature of the liquid in both the tank and the bath is controlled.

---

In a number of applications it is necessary to closely control the temperature of a liquid bath in which a work item is immersed. Typically such equipment is found in scientific laboratories where temperature control to a very precise degree is a prime objective. Such control has been attempted in the past by a circulator arrangement comprising a closed loop carrying liquid from a heat exchanger tank through the bath to be controlled and then back to the heat exchanger tank. The capability of such a system to accurately control the bath temperature is necessarily limited due to the fact that the system involves a first heat exchange in the heat exchanger tank to establish the temperature of that tank's liquid and then a second heat exchange from the liquid within the closed loop to the bath to be controlled. Such a double exchange limits the efficiency of this type of system. Furthermore, without an agitator in the bath, the temperature of the liquid in the bath alone is non-uniform.

The present invention overcomes these shortcomings by effectively providing a single heat exchange. More particularly, the liquid in the heat exchanger tank is temperature-controlled in the usual manner by a heat exchange operation. However, a double pump is immersed in the tank and is connected by open-ended conduits to the bath. One of the pumps is of the suction type which draws liquid from the bath through one conduit to the heat exchanger tank. The other pump is of the pressure type to force liquid from the tank through the other conduit to the bath. A level control device is provided to maintain the tank's liquid level constant so that the temperature of the liquid in the tank does not fluctuate due to variations in volume within the tank affecting the heat exchange relationship. Furthermore, the transfer of liquid between the tank and the bath under the forces developed by the pumps causes agitation such that the temperature of the liquid throughout the entire system is uniform. As a result, the temperature level of the bath is very precisely controlled.

The invention will be described in further detail by reference to the accompanying drawings, wherein:

FIG. 1 is a fragmented view, partially in section, illustrating the principal elements of the temperature control system for a liquid bath; and FIG. 2 is an enlarged view taken along the line 2—2 of FIG. 1.

Referring now to the drawings, the invention will be described in detail. A heat exchanger tank A is formed by walls 10 and 12, and a bath B is defined by walls 12 and 14. The temperature of liquid in the heat exchanger tank is controlled by conventional means (not shown). A double centrifugal pump is immersed in this liquid. The pump arrangement comprises a single shaft 16 to which impellers 18 and 20 are mounted. The impellers are enclosed within a housing 22. A baffle 24 within the housing separates the latter into two chambers each containing an impeller. The upper surface of the housing, as well as the baffle, are provided with apertures through which the shaft 16 projects. In addition, the housing's upper chamber contains a port 26, and the lower chamber is provided with ports 28 and 30. A pair of open-ended conduits 32 and 34 are connected to the housing at ports 26 and 30, respectively. These conduits extend to the bath B such that their open ends are submerged in the liquid therein.

A liquid level control device is incorporated in the heat exchanger tank. This comprises a float 36 riding on the surface of the liquid within the tank. An arm 38 is connected at one of its ends to the float. The other end of the arm projects through holes on opposite sides of conduit 32 above the level of the liquid within the tank. The arm 38 is bent intermediate the float and conduit 32 such that variation of the liquid level within the tank causes the arm 38 to rotate about the longitudinal axis of that portion of the arm within conduit 32. A flapper valve 40 is fixed to arm 38 within conduit 32 such that on rotation of the arm the passage through conduit 32 is varied.

Now that the structure of the invention has been explained, its operation will be described. Impellers 18 and 20 are designed in conventional fashion such that they serve within their respective housing chambers as a pressure type and a suction type of pump, respectively. In the illustrative embodiment the pressure type pump is designed to be somewhat stronger than the suction type pump. On actuation of the drive shaft 16 by a pump motor (not shown), the impellers rotate to start the pumping action. The suction type pump draws liquid from the bath B through conduit 34 and discharges liquid through port 28 into the heat exchanger tank A. The rate of discharge is sufficient to create considerable agitation and mixing of the liquid in the heat exchanger tank. Simultaneously, liquid in the heat exchanger tank A passes through apertures 42 in a casing 44 surrounding shaft 16 and into the upper chamber of housing 22 where the impeller 18 forces it through port 26 and conduit 32 into the bath B. The exit velocity of the liquid from conduit 32 is sufficievnt to agitate the bath liquid to thoroughly mix it.

The amount of liquid which is permitted to travel to the bath B is controlled by the position of flapper valve 40. As stated previously, the pressure type pump is stronger than the suction pump. Thus, the liquid tends to leave the heat exchanger tank A faster than it is replenished from the bath. Accordingly, the tendency of the float is to drop thereby pivoting valve 40 so as to reduce the passage of liquid to the bath B. It is apparent that a point of substantial equilibrium is reached at which the volume of liquid in the heat exchanger tank A remains constant. The level control device operates when conditions are disturbed to restore the situation whereby the continuous exiting of liquid from the tank A is balanced by intake from the bath B.

With substantial equilibrium established and a constant volume of liquid present in the heat exchanger tank, the temperature of the liquid in the tank A can be closely controlled. Since there is continuous recirculation between the tank A and the bath B, as well as thorough mixing action within each of these containers, the temperature of the liquid throughout the system is made uniform.

Therefore, a work item within the bath is subjected to an extremely precise temperature controlled environment.

The structure disclosed herein is an example of an arrangement in which the inventive features of this disclosure may be utilized. However, other combinations are possible. For example, the relative positions of the double pump and the open-ended conduits may be reversed. Also the pumps could be separate rather than mounted on a single shaft. By appropriate variation of the level control device in location and/or adjustment, the relative strengths of the pumps could be reversed. Thus, it is apparent a number of modifications may be made within the spirit of the invention as defined by the appended claims.

What is claimed is:
1. A system for controlling the temperature of liquid within a bath, comprising:
    (a) a tank containing liquid at a prescribed temperature;
    (b) a suction type centrifugal pump and a pressure type centrifugal pump immersed in the liquid in one of the tank or the bath;
    (c) separate open-ended conduits connected to respective ones of the pumps and having their open ends submerged in the liquid of the other of said tank or the bath; and
    (d) a level control device joined to one of the conduits and responsive to the liquid level in one of the tank or the bath for controlling liquid flow through said one conduit.
2. A system as set forth in claim 1 wherein the pumps are mounted on a single shaft.
3. A system as set forth in claim 2 wherein the pumps are immersed in the liquid in the tank.
4. A system as set forth in claim 2 wherein the suction type pump includes a discharge port within the liquid in which said pumps are immersed.
5. A system as set forth in claim 1 wherein the pumps are immersed in the liquid in the tank.
6. A system as set forth in claim 1 wherein the suction type pump includes a discharge port within the liquid in which said pumps are immersed.
7. A system as set forth in claim 1 wherein said level control device comprises a flapper valve within the conduit to which said device is joined and a float connected to the valve and resting on the liquid in one of the tank or the bath.
8. A system as set forth in claim 7 wherein the flapper valve is within the conduit connected to the pressure type pump.
9. A system as set forth in claim 8 wherein the pumps are mounted on a single shaft.
10. A system as set forth in claim 8 wherein the suction type pump includes a discharge port within the liquid in which said pumps are immersed.
11. A system as set forth in claim 10 wherein the pumps are mounted on a single shaft.
12. A system as set forth in claim 7 wherein the pumps are mounted on a single shaft.
13. A system as set forth in claim 7 wherein the suction type pump includes a discharge port within the liquid in which said pumps are immersed.
14. A system as set forth in claim 13 wherein the pumps are mounted on a single shaft.

References Cited
UNITED STATES PATENTS

| | | | |
|---|---|---|---|
| 1,866,064 | 7/1932 | Stratford | 137—394X |
| 2,564,306 | 8/1951 | Isreeli et al. | 137—99 |
| 2,934,082 | 4/1960 | Gilliard et al. | 137—315 |
| 3,301,318 | 1/1967 | Haake | 165—107X |
| 3,404,697 | 10/1968 | Walsh | 137—563X |

WILLIAM F. O'DEA, Primary Examiner

D. R. MATTHEWS, Assistant Examiner

U.S. Cl. X.R.

137—566; 165—107